United States Patent [19]
Ezaki et al.

[11] Patent Number: 5,514,845
[45] Date of Patent: May 7, 1996

[54] ELECTRODE TUBE FOR ELECTRICAL DISCHARGE MACHINING AND MANUFACTURING METHOD THEREOF

[75] Inventors: Shigeo Ezaki; Tsuyoshi Isejima; Kazutoshi Harada, all of Osaka, Japan

[73] Assignee: Sumitomo Electric Industries, Ltd., Osaka, Japan

[21] Appl. No.: 271,487

[22] Filed: Jul. 7, 1994

[30] Foreign Application Priority Data

Jul. 14, 1993 [JP] Japan .................................. 5-196902

[51] Int. Cl.⁶ ................................................. B23H 1/04
[52] U.S. Cl. ................................ 219/69.15; 29/592.1
[58] Field of Search ........................... 219/69.15, 69.14, 219/69.2; 29/592.1

[56] References Cited

U.S. PATENT DOCUMENTS

| | | | |
|---|---|---|---|
| 2,715,172 | 8/1955 | Larkins, Jr. | 219/69.15 |
| 3,622,734 | 11/1971 | Mainwaring | 219/69.15 |
| 4,855,557 | 8/1989 | Denny | 219/69.15 |

FOREIGN PATENT DOCUMENTS

| | | | |
|---|---|---|---|
| 57-144630 | 9/1982 | Japan | 219/69.15 |
| 57-144632 | 9/1982 | Japan | 219/69.15 |
| 58-171219 | 10/1983 | Japan | 219/69.15 |
| 62-39125 | 2/1987 | Japan | 219/69.15 |
| 538887 | 8/1973 | Switzerland . | |

Primary Examiner—Geoffrey S. Evans
Attorney, Agent, or Firm—W. G. Fasse; W. F. Fasse

[57] ABSTRACT

An electrode tube for electrical discharge machining includes an outer peripheral portion and a plurality of rails or ribs projecting inwardly from an outer peripheral portion toward the central axis of the tube. The rails or ribs are formed integrally with the outer peripheral portion by drawing, or cold rolling, or hot extrusion. The space inside the tube is substantially divided into a plurality of through holes along the central axis by the plurality of rails or ribs.

6 Claims, 3 Drawing Sheets

ELECTRODE TUBE FOR ELECTRICAL DISCHARGE MACHINING AND MANUFACTURING METHOD THEREOF

FIELD OF THE INVENTION

The present invention relates generally to electrode tubes for electrical discharge machining and to manufacturing methods for making the electrode tubes. More specifically, improvements in an electrode tube with a plurality of through holes and a method of manufacturing such an electron tube, are also disclosed.

BACKGROUND INFORMATION

When small holes are formed in a metal or alloy workpiece by means of electrical discharge machining, an electrode is used which is formed of a copper tube having an outer diameter for example in the range from 0.3 to 3.0 mm. A working fluid for cooling is passed through through holes of the electrode tube, electrical discharge is caused between the electrode tube and the workpiece while turning the electrode tube, whereby the workpiece is perforated.

However, as illustrated in a cross section shown in FIG. 8, an undesired core 7 forms inside an electrode tube 1 during electrical discharge machining of a workpiece 6. The core 7 lowers the precision of the electrical discharge machining, impedes a smooth electrical discharge machining operation and lowers the working efficiency as a result.

In order to solve such a problem, electrode tubes shown in FIGS. 9 to 11 have been suggested (see Japanese Patent Laying-Open No. 63-11239) (Watanabe et al., published Jan. 18, 1988).

An electrode tube 1 in FIG. 9 includes a cylindrical metal tube 2 and a metal partition 8 inserted in the cylindrical tube 2.

An electrode tube 1 illustrated in FIG. 10 includes a cylindrical metal tube 2 and two metal rods 9 inserted in cylindrical tube 2.

An electrode tube 1 shown in FIG. 11 includes a cylindrical metal tube 2 and two inner metal tubes 10 inserted in cylindrical tube 2.

The space in the cylindrical tube 2 of the electrode 1 shown in FIGS. 9 to 11 is divided into a plurality of through holes. Therefore, if electrical discharge machining is conducted while turning the electrode 1, an undesired core does not form in the electrode tube 1.

In the manufacture of electrode tubes as illustrated in FIGS. 9 to 11, a partitioning plate, thin rods, or inner tubes are inserted in tube 2 and then drawing operation must be performed. A tube material wound in a long coil cannot be used if such a partitioning plate, thin rods or thin inner tubes are inserted in the tube 2. The material of the tube 2 into which the partitioning plate, thin rods or thin inner tubes are inserted must be relatively short and straight. Therefore, the electrode tubes as shown in FIGS. 9 to 11 cannot be continuously produced from long tube material 2 initially wound in a coil for example, and the working or production efficiency cannot be improved.

SUMMARY OF THE INVENTION

In view of the foregoing problems associated with the related art described above, it is an object of the invention to provide an electrode tube wherein no undesired core is formed during electrical discharge machining. It shall be possible to form the electrode in a continuous operation from a long coiled tube material, in a respective manufacturing method.

An electrode tube for electrical discharge machining according to one aspect of the invention includes an outer peripheral portion and a plurality of rail or rib like portions projecting from the outer peripheral tube toward the central axis of the tube. These rail or rib like portion are formed integrally with the outer peripheral portion, and the space in the tube is substantially divided into a plurality of through holes along the central axis by the plurality of rail or rib like portions.

A method of manufacturing an electrode tube for electrical discharge machining according to another aspect of the invention includes the steps of forming a shaped tube by means of production selected from the group consisting of hot extrusion, cold rolling and drawing, and subjecting the shaped tube to drawing a plurality of times through dice having a circular hole, whereby an electrode tube having a plurality of through holes substantially divided by a plurality of rail or rib like tubes projecting from the outer peripheral tube toward the central axis in a cross section taken perpendicularly to the central axis.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
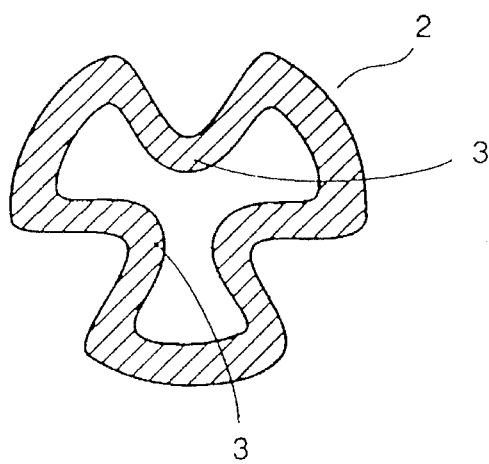
FIG. 1 is a cross-sectional view showing a metal tubular material for an electrode tube according to one embodiment of the invention.
Figure 2:
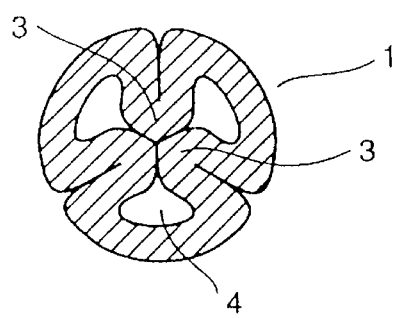
FIG. 2 is a cross-sectional view showing an electrode tube produced by drawing the tube material of FIG. 1 through dice.

Copper or copper alloy is most preferably used as a well conductive metal for forming an electrode tube for electrical discharge machining according to the present invention. One method of forming rail or ribs integrally in a tubular body wherein the rails or ribs extend toward the central axis of the tubular body involves, for example drawing a metal tube through shaping dice to produce a tube material 2 having a cross section including rails or ribs 3 as illustrated in FIG. 1. subjecting a metal tube 2 having such a cross section as shown in FIG. 1 to a drawing operation provides an electrode tube 1 as shown in FIG. 2 wherein the plurality of rails or ribs 3 are in contact with each other along the central axis of the electrode tube 1. The rails or ribs 3 divide the space in the electrode tube 1 into a plurality of through holes 4. Note that the number of through holes 4 is of course not limited to three, and an arbitrary number suitable for desired discharge machining conditions can be selected.

Figure 3:
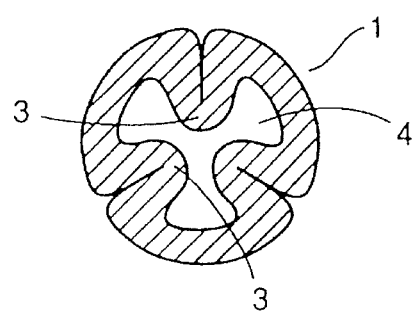
FIG. 3 is a cross-sectional view showing an electrode tube according to another embodiment similar to FIG. 2.

The plurality of rail or ribs 3 do not have to be exactly in contact with each other, but need only be close enough to each other such that an undesired core does not form along the central axis during discharge machining. More specifically, the plurality of through holes 4 do not have to be discretely separated from each other, and it is substantially possible to avoid an undesired core from forming during the machining even if the plurality of through holes communicate through a narrow space along the central axis as shown in FIG. 3.

Figure 4:
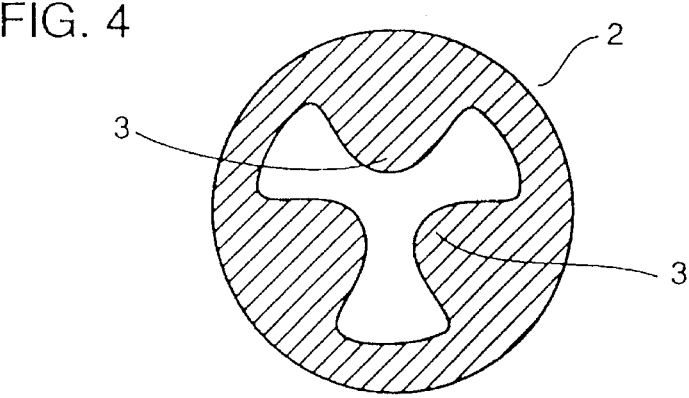
FIG. 4 is a cross-sectional view showing a tubular material used to manufacture an electrode tube according to yet another embodiment of the invention.
Figure 5:
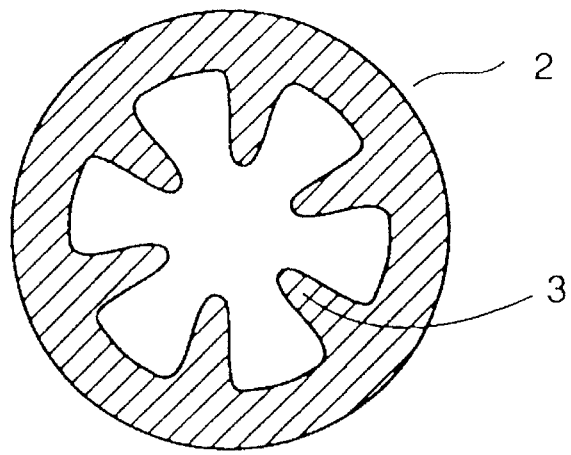
FIG. 5 is a cross-sectional view showing a tubular material used to manufacture an electrode tube according to a still further embodiment of the invention.
Figure 6:
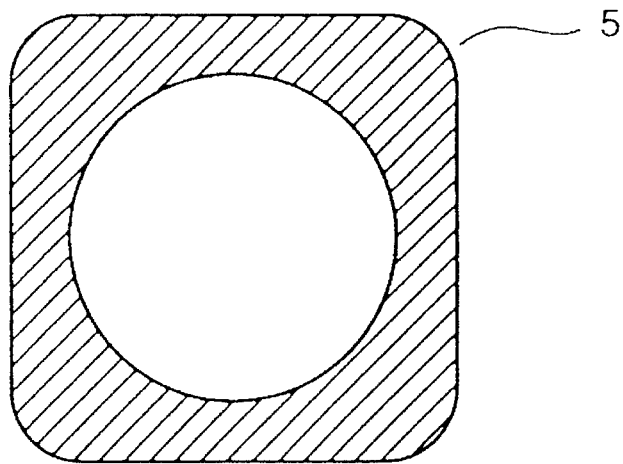
FIG. 6 is a cross-sectional view showing a tubular material used to manufacture an electrode tube according to a still further embodiment of the invention.
Figure 7:
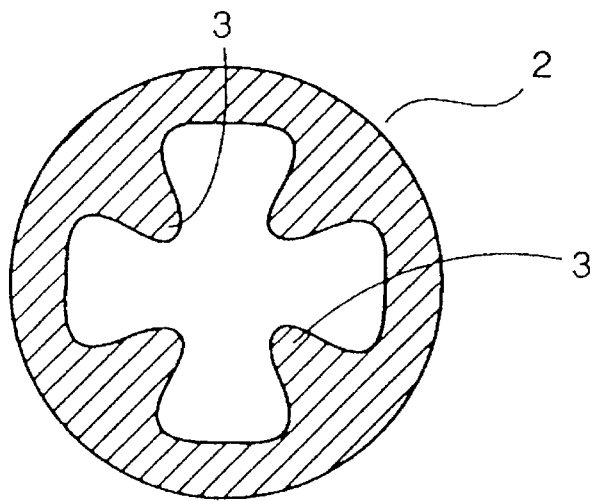
FIG. 7 is a cross-sectional view showing a tubular material changed by drawing the tube material shown in FIG. 6 through a dice having a circular hole.

A shaped metal tubular material for forming an electrode tube according to the present invention can be provided by hot extrusion, cold rolling, or drawing. By applying these working processes, for example, metal shape tube with cross-sections as shown in FIGS. 4 to 6 can be formed. Shape tubes 2 as illustrated in FIGS. 4 and 5 include a plurality of ribs 3 extending toward the central axis. The tube 5 shown in FIG. 6 has a substantially square outer shape and a circular inner shape. An electrode tube having the space inside the tube divided into a plurality of through holes can be manufactured by drawing such a shaped tube a number of times. FIG. 7 illustrates an example in which tubular material 5 shown in FIG. 6 is drawn through dice to form a circular outer shape, having four raised rails or ribs 3.

Instead of using as a starting material a tube having a circular inner shape, a tubular material with an outer shape including a plurality of raised portions extending in a direction away from the central axis, or a shaped tube having an elliptical outer shape may be used. More specifically, a tubular material having a wall thickness significantly changing periodically along the circumferential direction as shown in FIG. 6, is subjected to drawing through a die having a circular hole, whereby the mass of a thick wall portion is shifted from the corners toward the central axis of the tube to form ribs 3 projecting toward the central axis.

DESCRIPTION OF THE PREFERRED EMBODIMENTS

Figure 8:
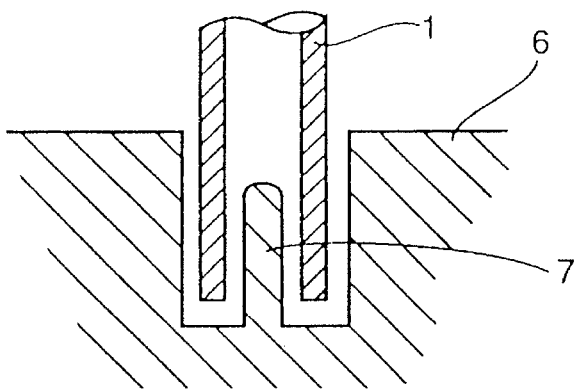
FIG. 8 is a cross-sectional view showing how an undesired core forms during electrical discharge machining in a prior art electrode tube.
Figure 9:
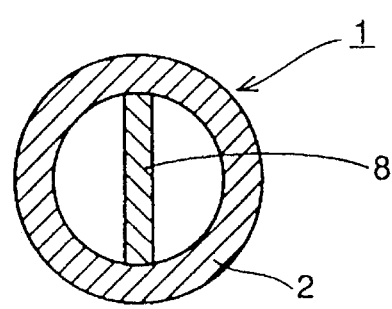
FIG. 9 is a cross-sectional view showing an example of a prior art electrode tube having a plurality of through holes.
Figure 10:
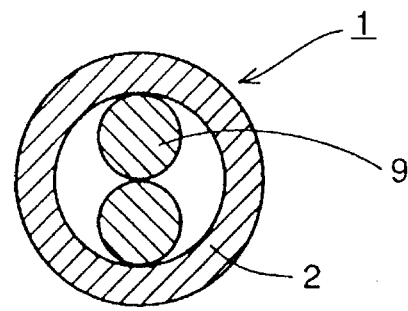
FIG. 10 is a cross-sectional view showing another example of a prior art electrode tube having a plurality of through holes.
Figure 11:
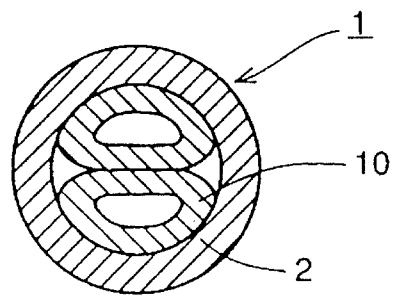
FIG. 11 is a cross-sectional view yet another example of a prior art electrode tube having a plurality of through holes.

A tubular material of copper deoxidized by phosphorus having an outer diameter of 6.0 mm and a wall thickness of 0.5 mm is drawn into an outer diameter of 1.8 mm, then continues to be drawn through shaping dice, whereby a shaped tube having a cross section as shown in FIG. 1 is formed and coiled. The shaped tube taken off the coil is drawn through a dice having a circular hole. The drawings is repeated until an electrode tube having an outer diameter of 0.8 mm and a cross section as shown in FIG. 2 is formed. The tube so formed is wound into a coil. An electrode tube having a length of 300 mm is cut thus manufactured coil of from thus manufactured coil of straightened and used as an electrical discharge machining electrode to form small holes in cemented carbide parts. As a result, it was confirmed that with the discharge electrode tube of this embodiment, an undesired core 7 as shown in FIG. 8 does not form and highly precise small holes can be machined.

The Effect of the Invention

According to the present invention, the space inside the electrode tube is substantially divided into a plurality of through holes by rails or ribs projecting inwardly toward the central axis, and therefore, an undesired core does not form during electrical discharge machining. In the electrode tube according to the present invention, insertion of a partitioning member in the tube material as practiced conventionally is not necessary because the ribs can be formed by continuously plastic-working the tubular material, and a long electrode tube which can be wound in a coil can be efficiently manufactured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrode tube for electrical discharge machining, comprising an integral single piece tubular member produced by first extruding or cold rolling and then drawing so that said integral single piece tubular member has a substantially circular outer shape in a cross-section taken perpendicularly to a central longitudinal axis, said integral single piece tubular member comprising an outer peripheral portion and a plurality of radially inwardly projecting longitudinal ribs (3) extending integrally from said peripheral portion inwardly toward said central longitudinal axis of said integral single piece member to such an extent that radially inner ends of said ribs (3) contact each other along said central longitudinal axis, whereby a space inside said integral single piece tubular member is substantially divided by said plurality of ribs (3) into a plurality of through holes extending parallel to said central longitudinal axis.

2. The electrode tube for electrical discharge machining of claim 1, wherein said electrode tube is made of a material selected from the group consisting of copper and copper alloys.

3. A method of manufacturing an electrode tube for electrical discharge machining, comprising the following steps:
   (a) forming an integral, single piece tubular member by a working process selected from the group consisting of hot extrusion, cold rolling and drawing;
   (b) further drawing said integral, single piece tubular member a plurality of times through dice having a circular hole, thereby forming said electrode tube with a plurality of radially inwardly extending ribs that separate longitudinal through holes from each other, said ribs projecting from an outer peripheral portion of said integral single piece tubular member toward a central longitudinal axis of said single piece integral tubular member; and
   (c) repeating said further drawing steps until said ribs contact each other along said central longitudinal axis.

4. The method of manufacturing an electrode tube of claim 3, wherein said forming step is performed so that said single piece integral tubular member has a wall with an even wall thickness in a cross-section taken perpendicularly to said central longitudinal axis, and wherein said further drawing steps cause wall portion to buckle radially inwardly to curve toward said central longitudinal axis to form said ribs contacting each other at said central longitudinal axis.

5. The method of manufacturing an electrode tube of claim 3, wherein said forming step is performed so that said single piece integral tubular member has a substantially square outer configuration and a circular inner configuration so that said single piece integral tubular member has a wall thickness in a cross-section taken perpendicularly to said central longitudinal axis that is thicker near corners of said substantially square outer configuration and thinner along sides of said substantially square outer configuration, and wherein said further drawing steps cause material of said thicker wall thickness near said corners to move radially inwardly to form said ribs contacting each other along said central longitudinal axis.

6. The method of manufacturing an electrode tube of claim 3, further comprising winding said electrode tube into a coil after all of said further drawing steps have been completed.

* * * * *

UNITED STATES PATENT AND TRADEMARK OFFICE
CERTIFICATE OF CORRECTION

PATENT NO. : 5,514,845
DATED : May 7, 1996
INVENTOR(S) : Ezaki et al.

It is certified that error appears in the above-identified patent and that said Letters Patent is hereby corrected as shown below:

On the title page: Item [30]
under "Foreign Patent Documents" please add, "63-11239  1/88  Japan"
Column 1, line 55, after "inserted" insert --,--;
Column 2, line  7, replace "portion" by --portions--;
Column 2, line 15, replace "production" by --a production method--;
Column 2, line 18, after "electrode tube" insert --is produced--;
Column 2, line 20, replace "tubes" by --portions--;
Column 2, line 21, replace "tube" by --portion--;
Column 2, line 61, after "view" insert --of--;
Column 3, line  2, replace "rail" by --rails--;
Column 3, line  4, after "example" insert --,--;
Column 3, line  7, delete "such";
Column 3, line 31, replace "Shape" by --Shaped--;
Column 3, line 40, delete ",";
Column 3, line 62, replace "drawings" by --drawing--;
Column 3, line 66, replace "thus manufactured coil of" by --from the coil--;
Column 3, line 67, delete "from thus manufactured coil of";
Column 5, line  3, replace "portion" by --portions--.

Signed and Sealed this

Twenty-third Day of July, 1996

Attest:

BRUCE LEHMAN

*Attesting Officer*         *Commissioner of Patents and Trademarks*